(12) United States Patent
Ittel et al.

(10) Patent No.: US 7,678,850 B2
(45) Date of Patent: *Mar. 16, 2010

(54) PIGMENT DISPERSIONS CONTAINING AMINATED ACRYLIC MACROMONOMER DISPERSANT

(75) Inventors: Steven Dale Ittel, Wilmington, DE (US); Karyn B. Visscher, Voorhees, NJ (US); Alexei A. Gridnev, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/638,115

(22) Filed: Dec. 12, 2006

(65) Prior Publication Data

US 2007/0142546 A1 Jun. 21, 2007

Related U.S. Application Data

(60) Provisional application No. 60/751,233, filed on Dec. 16, 2005.

(51) Int. Cl.
C08K 5/5435 (2006.01)
C08K 3/28 (2006.01)
C08G 67/02 (2006.01)
C08F 12/28 (2006.01)

(52) U.S. Cl. .................. 524/99; 524/428; 524/612; 526/310

(58) Field of Classification Search .......... 524/99, 524/428, 612; 526/310
See application file for complete search history.

(56) References Cited

U.S. PATENT DOCUMENTS

| 4,591,533 A | 5/1986 | Antonelli et al. |
| 4,680,352 A | 7/1987 | Janowicz et al. |
| 4,694,054 A | 9/1987 | Janowicz |
| 4,886,861 A | 12/1989 | Janowicz |
| 4,910,268 A * | 3/1990 | Kobayashi ............. 525/411 |
| 5,028,677 A | 7/1991 | Janowicz |
| 5,264,530 A | 11/1993 | Darmon et al. |
| 5,587,431 A | 12/1996 | Gridnev et al. |
| 5,773,534 A | 6/1998 | Antonelli et al. |
| 5,883,206 A | 3/1999 | Ittel et al. |
| 6,117,958 A | 9/2000 | Ittel et al. |
| 6,388,036 B1 | 5/2002 | Gridnev et al. |
| 6,624,261 B1 | 9/2003 | Moad et al. |

FOREIGN PATENT DOCUMENTS

| EP | 0 450 876 A2 | 10/1991 |
| WO | WO 03/006555 A1 | 1/2003 |

OTHER PUBLICATIONS

PCT International Search Report and Written Opinion for International Application No. PCT/US2006/048236 dated May 30, 2007.

* cited by examiner

*Primary Examiner*—Tae H Yoon
(74) *Attorney, Agent, or Firm*—Gann G. Xu

(57) ABSTRACT

A pigment dispersion useful for forming coating compositions containing dispersed pigment, a carrier solvent and an aminated macromonomer dispersant (binder) is disclosed. The aminated macromonomer dispersant is preferably prepared by the reaction of terminally unsaturated macromonomers synthesized by cobalt-catalyzed chain transfer free radical polymerizations of methacrylic monomers with monomeric or oligomeric amines.

12 Claims, No Drawings

PIGMENT DISPERSIONS CONTAINING AMINATED ACRYLIC MACROMONOMER DISPERSANT

CROSS-REFERENCE TO RELATED APPLICATION

This application claims the benefit of U.S. Provisional Application Ser. No. 60/751,233 filed on Dec. 16, 2005 which are hereby incorporated by references in its entirely.

FIELD OF THE INVENTION

This invention relates to improved pigment dispersions containing an aminated macromonomers dispersant, and pigmented coating compositions containing the same.

BACKGROUND OF THE INVENTION

Dispersible polymers that are used as dispersants for pigments and used to form pigment dispersions useful in formulating both solvent-borne and water-borne coating compositions are known in the art. Such pigment dispersions are used in the preparation of exterior finishes for automobiles and trucks. Government mandated reduction of volatile organic components (VOC) in these finishes drives a quest for ever-improving coating compositions. Dispersion of pigments is a critical feature of the composition formulation An exterior automotive or truck finish containing a water sensitive component is undesirable since for example, water spotting and acid etching will result and the finish will be subject to degradation by weathering. A low VOC oligomeric dispersant is needed that will adequately disperse pigments and the dispersant should contain a segment readily dissolved in the chosen solvent and a segment that will attach to the surface of the pigment to be dispersed. The inventors have found that when such a oligomeric dispersant made from a particular macromonomer is used in a coating composition, a finish is formed that is free from the undesirable effects of water and weathering.

SUMMARY OF THE INVENTION

Disclosed herein is a pigment dispersion composition useful for forming coating compositions comprising a dispersed pigment, a carrier liquid and an aminated macromonomer dispersant; wherein: the aminated macromonomer dispersant comprises the structure

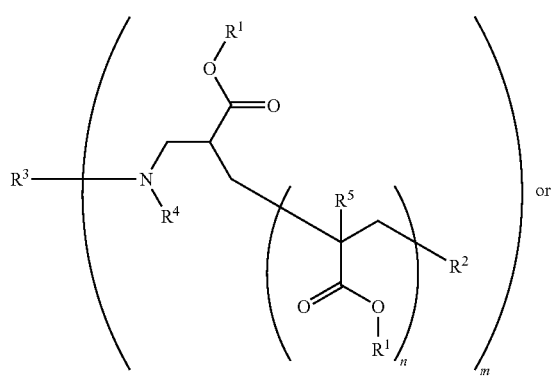

or

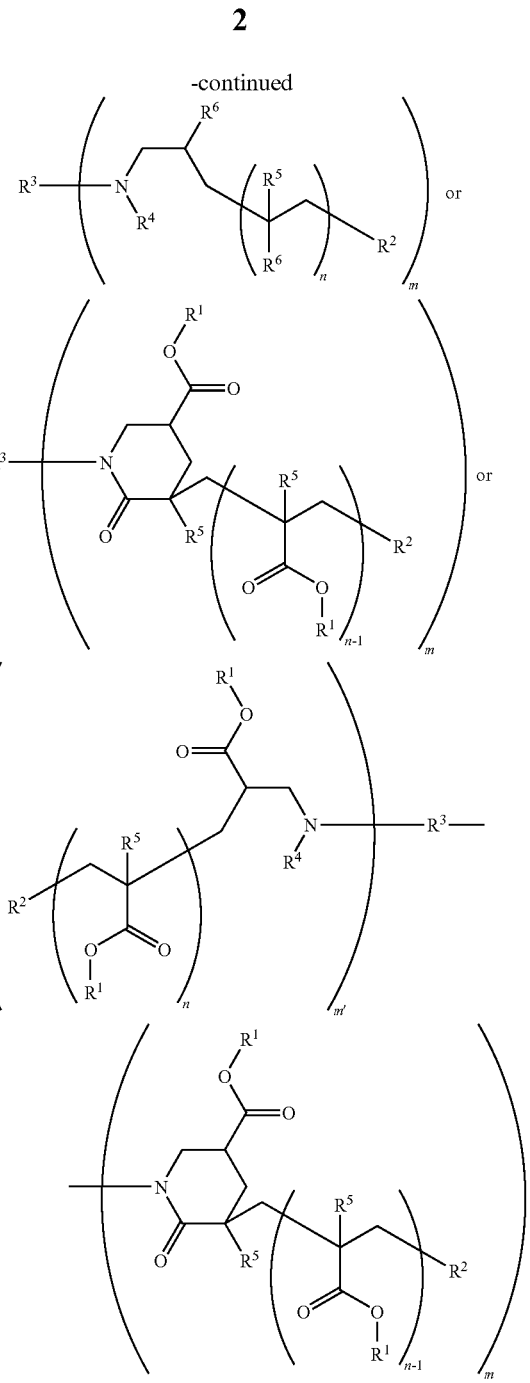

wherein each $R^1$ and $R^2$ are independently H, alkyl of 1-20 carbon atoms, aryl, substituted alkyl of 1-20 carbon atoms, or substituted aryl; $R^3$ and $R^4$ are independently H, alkyl of 1-100 carbon atoms, or substituted alkyl of 1-100 non-hydrogen atoms or $R^3$ is a polymer; $R^5$ is methyl, hydrogen or hydroxymethyl; $n=1-100$; $m=1-100$ or $m+m'=1-100$ and is equal to or less than the number of reactive amino groups on $R^3$, and; $R^6$ are independently —CN, —$CO_2R^1$, —$COR^1$, or —$CONR^1R^1$.

DETAILED DESCRIPTION OF THE INVENTION

The novel pigment dispersion is stable and in general non-flocculated or non-agglomerated and is compatible with a variety of polymeric, film forming binders that are conventionally used in coating compositions and in particular, compatible with acrylic polymers that are used in coatings. The aminated macromonomer dispersant, upon curing of the coating composition into which it has been incorporated, reacts with other film forming components of the coating composition and becomes part of the film and does not cause deterioration of the film upon weathering as may occur if it remained an unreacted component of the film, so, since the aminated macromonomer is an excellent dispersant. The monomer content of the backbone of the macromonomer can readily be adjusted to maximize dispersion properties of the aminated macromonomer dispersant without increasing molecular weight and not detract from the performance properties of a coating composition into which the pigment dispersion containing the aminated macromonomer dispersant has been incorporated. Finishes of coatings formulated with dispersions containing these aminated macromonomer dispersants are hard, water and humidity resistant.

The aminated acrylic macromonomer used to formulate the dispersion of this invention is prepared from a "macromonomer" having the structure

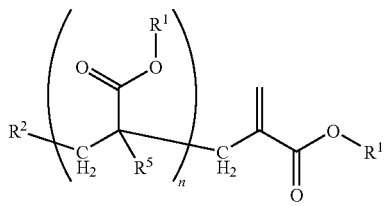

wherein each $R^1$ and $R^2$ are independently H, alkyl of 1-20 carbon atoms, aryl, substituted alkyl of 1-20 carbon atoms, or substituted aryl and $R^5$ is methyl, hydrogen or hydroxymethyl, and n=1-100, preferably n=1-50. These oligomers or macromonomers are preferably prepared by the free radical polymerization of the appropriate monomers in the presence of a macrocyclic cobalt chain transfer catalyst. These and related species are referred to herein interchangeably as "oligomers," or "macromonomers" and the terms are further intended to incorporate the products of copolymerizations of methacrylates with other methacrylates as well as with acrylates and with other free-radically copolymerizable monomers. These oligomers and their production are described in a series of U.S. patents issued to DuPont that include U.S. Pat. No. 6,624,261, U.S. Pat. No. 6,388,036, U.S. Pat. No. 6,117,958, U.S. Pat. No. 5,883,206, U.S. Pat. No. 5,587,431, U.S. Pat. No. 5,028,677, U.S. Pat. No. 4,886,861, U.S. Pat. No. 4,694,054, and U.S. Pat. No. 4,680,352.

As used herein, the term "acrylic" is a general term meant to encompass a variety of ethylenically unsaturated monomers and comonomers that may be copolymerized with methacrylate monomers to form the oligomers or macromonomers employed in this disclosure. Thus the resulting macromonomers may comprise a variety of methacrylate ester monomers, acrylate ester monomers, styrene and alpha-methylstyrene, acrylonitrile and methacrylonitrile monomers. Other comonomers such as methylenebutyrolactone, vinylpyrrolidinone, chloroprene, vinyl acetate may also be incorporated into the macromonomers in lesser amounts.

The resulting aminated macromonomer dispersants comprise the structure

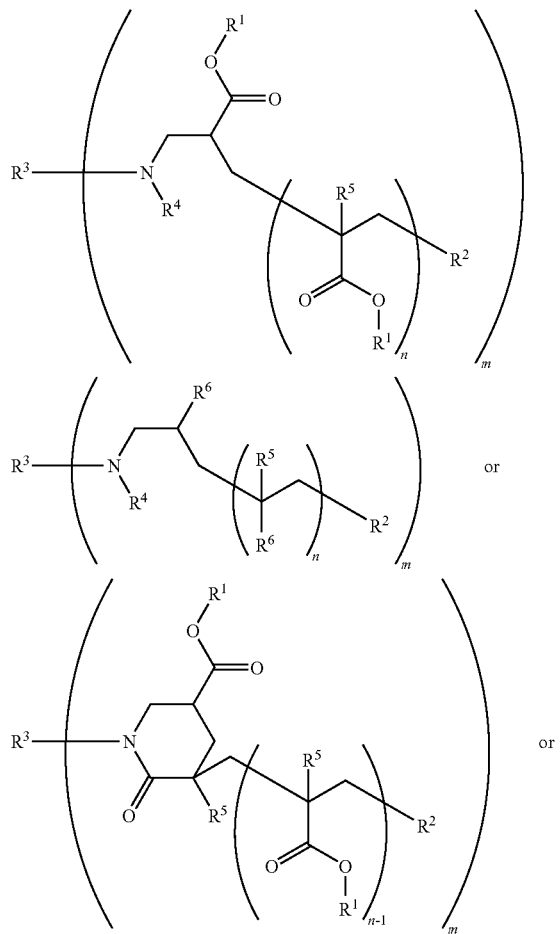

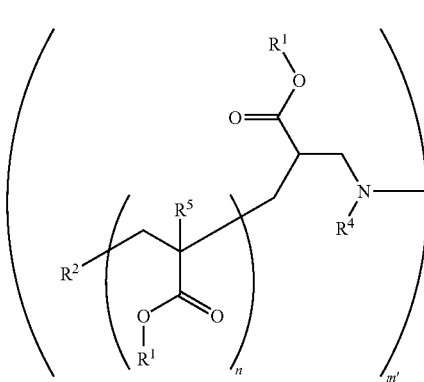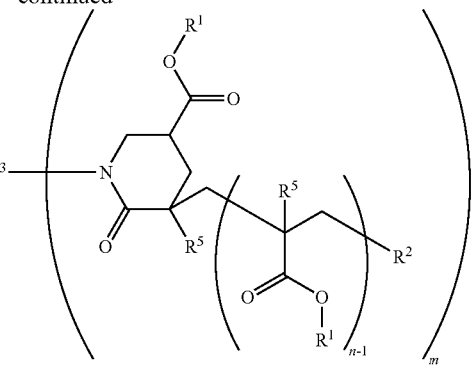

wherein each $R^1$ and $R^2$ are independently H, alkyl of 1-20 carbon atoms, aryl, substituted alkyl of 1-20 carbon atoms, or substituted aryl; $R^3$ and $R^4$ are independently H, alkyl of 1-100 carbon atoms, or substituted alkyl of 1-100 non-hydrogen atoms or $R^3$ is a polymer; $R^5$ is methyl, hydrogen or hydroxymethyl; n=1-100; m=1-100 or m+m'=1-100 and is equal to or less than the number of reactive amino groups on $R^3$, and; $R^6$ are independently —CN, —$CO_2R^1$, —$COR^1$, or —$CONR^1R^1$.

As distinguished from the terms oligomers or macromonomers that are used to describe the acrylic portion of the aminated products described herein, the term "polymer" or "polymeric" is used herein to refer to the portion of the aminated products derived from the amine-containing species and is specified as $R^3$ in the structures above. When $R^3$ is polymeric, the polymer may be derived from monomers such as ethylene oxide, or ethyleneimine. A polymeric system derived from ethylene oxide is terminated with an amino group. A system derived from ethyleneimine contains a plurality of amino groups. Amino-terminated polyethylene or amine-terminated nylon are other examples of polymeric amines suitable for use in this disclosure. $R^3$ also includes species with molecular weights up to a million, or more frequently having molecular weights of hundreds to thousands. The distinction between molecular amines and polymeric amines is based largely upon their derivation and the two classes of species represent a continuum. For example, decylamine may be considered to be a very low molecular weight version of amine-terminated polyethylene, $H(C_2H_4)_n NH_2$ where n=5. Another family of suitable polymeric amine is based upon polymers of 2-aminoethyl methacrylate, so it is possible that $R^3$ incorporates acrylic monomers.

The substituent $R^1$ on the ester group is selected from alkyl or substituted alkyl groups, aryl groups, and substituted aryl groups. The terminal substituent, $R^2$, on the ester group is selected from hydrogen atom, alkyl substituted alkyl aryl and substituted aryl.

By "alkyl" is meant a linear or branched saturated hydrocarbyl unit ranging from methyl, ethyl, propyl, to much higher carbon numbers including polymeric species. Branched alkyl includes isopropyl, isobutyl, sec-butyl, neopentyl, and much higher carbon numbers including polymeric species.

A "substituted alkyl" is an alkyl having a non-hydrogen functionality attached to or in place of any of the carbon atoms of the alkyl. The substituents may be the same or different and selected, for example, from carboxylic ester, hydroxyl, alkoxy, tertiary amino, trifluoromethyl, perfluoroalkyl and other substituted and unsubstituted alkyl, substituted and unsubstituted aryl, substituted and unsubstituted olefin and halogen. Substituted alkyl also includes species in which one or more of the carbon atoms other than the first carbon atom of the alkyl are substituted with heteroatoms such as oxygen, sulfur, silicon, tin or other elements. Substituted alkyl groups generally do not bear functionality that can react with amines under the conditions of the reactions disclosed herein. If such reactions can occur, they are taken into consideration when formulating a stoichiometry for the reaction. For instance, a glycidyl group would be an inappropriate choice of substituted alkyl because it is well known to those skilled in the art that amines will cause a ring-opening reaction of the epoxy functionality. Carboxylic acids will react with the amines to form ammonium salts thereby inhibiting the reaction.

Preferred alkyl or substituted alkyl groups include methyl, ethyl, propyls (all isomers), butyls (all isomers), 2-ethylhexyl, isobornyl, octyl (all isomers), higher normal and branched alkyls, and cyclohexyl. Benzyl and substituted benzyls, neophyl, phenylethyl, and naphthylmethyl are preferred examples of arylalkyls, a class of substituted alkyls. Preferred examples of substituted alkyl groups include 2-hydroxyethyl, 2-hydroxypropyl, trimethoxysilylpropyl, methoxyethyl, trimethylsilylmethyl, 11-carbomethoxyundecyl, trimethoxysilylpropyl, methylthiopropyl, trifluoromethyl, 6,6,6-trifluorohexyl, triethoxysilylpropyl, tributoxysilylpropyl, dimethoxymethylsilylpropyl, diethoxymethylsilylpropyl, dibutoxymethylsilylpropyl, diisopropoxymethylsilylpropyl, dimethoxysilylpropyl, diethoxysilylpropyl, dibutoxysilylpropyl, diisopropoxysilylpropyl, 2-(oxyethyl hydrogen propanedioate) and trimethylsilylmethyl.

By "aryl" is meant aromatic groups, including aryl and heteroaryl rings, examples being phenyl, naphthyl, pyridyl, pyrimidyl, benzoxoylanthracenyl.

"Substituted aryl" refers to aromatic groups substituted with functional substituents being the same or different and selected, for example, from carboxylic ester, hydroxyl, alkoxy, amino, secondary amino, tertiary amino, trifluoromethyl, perfluoroalkyl and other substituted and unsubstituted alkyl, substituted and unsubstituted aryl, substituted and unsubstituted olefin and halogen.

The substituent $R^2$ on the oligomer backbone is generally a hydrogen atom, derived from the catalytic chain transfer process, though it is not limited to such. $R^2$ may be selected from alkyls, substituted alkyls, aryls and substituted aryls. $R^2$ may originate from copolymerizations of methacrylic monomers with acrylic monomers, particularly those resulting from cobalt-catalyzed chain transfer as disclosed, for example, in U.S. Pat. No. 6,624,261; from chain initiation with a nonpolymerizable monomer as disclosed, for example, in U.S. Pat. No. 6,117,958; or from chain transfer in an acrylic polymerization when methacrylate macromonomers are utilized as chain transfer reagents, as disclosed, for example, in U.S. Pat. No. 5,773,534 and U.S. Pat. No. 5,264,530. Finally, $R^2$ may originate from conventional chemical syntheses or modifications.

Amine-functionalized compounds are one of the most diverse classes of organic molecules. Thus, a reaction with amines can bring a wide range of new functionalities to their reaction products. In preferred embodiments, amine functionalities include amines

$R^3$—$NH_2$ and $R^3R^4NH$ wherein the substituents $R^3$ and $R^4$ on the amine are selected from a hydrogen atom, alkyl groups, and functionalized alkyl groups. Preferred functional groups include methyl, ethyl, propyls (all isomers), butyls (all isomers), 2-ethylhexyl, isobornyl, benzyl and substituted benzyls, cyclohexyl, 2-hydroxyethyl, 2-hydroxypropyl, trimethoxysilylpropyl, triethoxysilylpropyl, tributoxysilylpropyl, dimethoxymethylsilylpropyl, diethoxymethylsilylpropyl, dibutoxymethylsilylpropyl, diisopropoxymethylsilylpropyl, dimethoxysilylpropyl, diethoxysilylpropyl, dibutoxysilylpropyl, diisopropoxysilylpropyl, and higher normal and branched alkyls. Further included in the amines are bifunctional amines, polyfunctional amines, and polymeric amines. $R^3$ and $R^4$ may be combined in a cyclic structure. Examples of ring structures include piperidine, piperazine, 4'-piperazineacetophenone. $R^3$ and $R^4$ may be constituents of polyfunctional amines, bifunctional amines or diamines, polyfunctional amines or polymeric amines.

"Bifunctional amine" or "diamine" means an organic moiety having two amino groups that will be active in the reaction or process described herein. Examples would include ethylenediamine, 1,6-hexamethylenediamine, 1,4-bis(aminomethyl)benzene, diamino-terminated polyethyleneoxide, or diaminopropyl-terminated poly(dimethylsiloxane). Hydrazine and substituted hydrazines would be the most simple diamines.

"Polyfunctional amine" means an organic moiety having two or more amino groups that are active in the reactions and processes disclosed herein. Examples include tris(aminoethyl)amine, amino-ethyl-functionalized polystyrene, and aminopropyl-functionalized poly(dimethylsiloxane).

"Polymeric amine" means an amino-containing organic moiety based upon a polymeric backbone. The amino group may be in the backbone of the polymer or may be pendant to it.

The polymeric amines are a more limited but nonetheless significant class of amines. They range from polymers terminated with a single amine group to polymers in which amine functionality is incorporated into each repeat group in the polymer backbone. Examples include diamino-terminated polyethyleneoxide, diaminopropyl-terminated poly(dimethylsiloxane), amino-ethyl-functionalized polystyrene, aminopropyl-functionalized poly(dimethylsiloxane), and in particular, linear and branched polyethyleneimine.

By "reactive amino groups" is meant those amino groups that are capable of undergoing the reactions described herein, as opposed to "unreactive amino groups." Tertiary amines have no reactive hydrogen atom and are thus incapable of being "reactive amino groups." Other unreactive amino groups are those which are too sterically encumbered to undergo reaction or chemically deactivated by being attached to aromatic groups. A "reactive amino group" may be rendered unreactive by being too close to another reactive amino group in the same molecule such that when the other reactive amino group has reacted, the sterics become too crowded for a second reaction. Tertiary alkyl groups can render amines unreactive as can multiple isoalkyl groups.

As used herein, the term "derived from" refers to the origin of substituents (Q or $R^3$) that are part of the disclosed compositions and that originated from the diverse range of amines that are reacted with the products of catalytic chain transfer. For instance, in a compound derived from the amine

$R^3$—$NH_2$ if $R^3$ is octyl, then the substituent octyl is said to have been derived from the amine, octylamine or 1-aminooctane. The products can similarly be derived from diamines $H_2N$—Q—$NH_2$ in which case an oligomer would add to one or preferably both amino groups. For instance, if 1,6-hexanediamine were employed, the Q derived from that reaction would be the hexamethylene group, —$(CH_2)_6$—. When polymeric polyamines are employed, Q becomes the polymeric backbone without the amine groups. It is not expected that addition will be complete; some or many of the pendant amine groups will remain unreacted, particularly if the amine groups are closely spaced down the polymer backbone.

The aminated macromonomers are most effective dispersants when they have been functionalized with groups that interact with and/or attach to the pigment surface, also known as "pigment anchoring groups". Pigment anchoring groups selectively associate with the surface of the pigments, thereby anchoring of the aminated macromonomer dispersant to that pigment particle. Anchoring groups frequently employed include but are not limited to aromatic esters, aromatic amines, imides, aliphatic amines, aromatic nitrogen heterocycles, and quaternary ammonium compounds. The anchoring segment can be attached to the macromonomer by reacting amine functional groups on the anchoring molecules with the unsaturation of the macromonomer.

The aromatic ester anchoring groups can be attached as pendant groups to the macromonomer through pendant aminoalkyl groups. The esters of the aromatic carboxylic acids useful herein may be unsubstituted or may contain substituents, such as, e.g., nitro groups, hydroxy, amino, ester, acryloxy, amide, nitrile, halogen, haloalkyl, alkoxy, and the like. Examples include aminoalkyl esters of benzoic acid, 2-nitrobenzoic acid, 3-nitrobenzoic acid, 4-nitrobenzoic acid, 3,5-dinitrobenzoic acid, 1-naphthoic acid, 3-chlorobenzoic acid, 4-biphenyl carboxylic acid, 4-sulfamido benzoic acid, nicotinic acid, and the like. Useful aminoalkyl compounds for esterification include aminoethanol and aminopropanol. Alternatively, the reactive amino functionality may be introduced as a substituent on the aromatic ring and then the alkyl of the ester functionality may be chosen independently.

Alternatively, the aromatic amine anchoring groups are preferably tertiary aromatic amines. They may contain substituents such as, e.g., hydroxy, ester, acyloxy, amide, nitrile, halogen, haloalkyl, alkoxy, and the like. The aminoalkyl group for reaction with the macromonomer may be incorporated into the amine group or it may be a substituent on the aromatic ring. Examples of N-substituted aromatic amines include N-benzyl(aminoethyl)methylamine, N,N-dibenzyl (aminopropyl)amine, or N-methyl-N-aminopropylaniline.

Ring-substituted alkylaminoaromatic amines include 2-(aminoethyl)pyridine, 4-aminopropyl-N,N-dimethylaniline, and the like.

Amide anchoring groups are generally based upon phthalimide, maleimide and saccharin. Functionalization in generally through the heterocyclic nitrogen atom and would include species such as N-aminoalkylphthalimide, N-aminoalkylmaleimide, and N-aminoalkylsaccharin. Alternatively, the aminoalkyl functionality may be attached to the aromatic ring.

Quaternary ammonium compounds are effective groups for anchoring pigment particles. Aminated macromonomers containing quaternary ammonium functionality will generally be prepared by the addition of polyamines to the macromonomers followed by subsequent quaternization. Some polyamines are rich enough in quaternary sites that subsequent quaternization is not required. A good example would be polyethyleneimine.

Certain pigments are effectively anchored by nitrogen heterocycles. The nicotinic acid derivatives above would fall into this class of anchors, but the class would also include compounds such as 4-(3-aminopropyl)morpholine, 3-aminomethyl pyridine, and 1-(3-aminopropyl)imidazole.

Alternatively, aromatic amine containing monomers, such as 4-aminostyrene, 2-vinyl pyridine, 4-vinyl pyridine, and the like, may be directly copolymerized into the macromonomer to form the aromatic amine anchoring groups, if desired.

It has been found that improved coating compositions are obtained by using the aminated macromonomers as dispersants for pigments. The compositions also contain a film forming binder usually an acrylic polymer and a curing agent. Such compositions have the advantage of providing excellent coating properties desirable for automotive finishes.

The coatings compositions of this invention contain in addition to the pigment dispersion a binder preferably of an acrylic-based polymer and a crosslinking agent such as a melamine crosslinking agent, a polyisocyanate crosslinking agent or a blocked polyisocyanate crosslinking agent, in a liquid carrier. The liquid carrier can be an organic solvent, water, and water and organic co-solvent blend.

When the dispersion containing the aminated macromonomer dispersant is used in an aqueous coating composition, the film-forming copolymers form stable solutions or dispersions. These coating compositions also contain about 10-70%, more typically 15-50% by weight of binder, and about 30-90%, more typically 50-85% by weight, of the liquid carrier which is water alone or a mixture of mainly water and customary water-soluble organic solvent or blend. Suitable coating compositions are prepared by blending other useful components in accordance with normal paint formulation techniques.

The acrylic based polymer binders typically are polymers of alkyl (meth)acrylates having 1-12 carbon atoms in the alkyl group, hydroxy alkyl (meth)acrylates having 1-4 carbon atoms in the alkyl group and methacrylic or acrylic acid and have a number average molecular weight of 5,000-30,000 and are neutralized with ammonium hydroxide or an amine to form aqueous solutions or dispersions. The aforementioned alkyl (meth)acrylates, hydroxy alkyl (meth)acrylates can be used to formulate these polymers.

To form a coating composition which will crosslink under elevated baking temperatures of about 60-180" C. for about 5-60 minutes, about 10 to 50%, preferably 15 to 30% by weight, based on the weight of the binder, of an alkylated melamine formaldehyde crosslinking agent having 1-4 carbon atoms in the alkylated group is preferred.

These crosslinking agents are generally partially or fully alkylated melamine formaldehyde compounds and may be monomeric or polymeric as described above. Blocked isocyanates can also be used as crosslinking agents. Coating compositions containing a melamine crosslinking agent can contain about 0.1 to 1.0% by weight, based on the weight of binder, of a strong acid catalyst or a salt thereof to lower curing temperatures and time. Aromatic sulfonic acids such as para-toluene sulfonic acid or its ammonium salt are preferred catalysts. Other catalysts that can be used are dodecyl benzene sulfonic acid, phosphoric acid and amine or ammonium salts of these acids.

Other film forming polymers can also be used in these coating compositions such as urethanes, polyesters and polyester urethanes, polyethers and polyether urethanes that are compatible with pigment dispersions containing the aminated macromonomer dispersants of the present invention. When the dispersion of this invention is aqueous, a solvent can be utilized, preferably in minimal amounts, to facilitate formulation and application of the coating compositions formulated with dispersions of the present invention. An organic solvent is utilized which is compatible with the components of the composition.

To form a pigment dispersion or a millbase, pigments are typically added to the aminated macromonomer dispersant in the customary organic solvent or blend and are dispersed using conventional techniques such as high speed mixing, ball milling, sand grinding, attritor guiding, or two or three roll milling. Dispersion may also be accomplished by passing the mixture through a plurality of nozzles within a liquid jet interaction chamber at a liquid pressure of at least 5,000 psi. The resulting pigment dispersion has a pigment to aminated macromonomer dispersant weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

When the dispersion containing the aminated macromonomer dispersant is used in an organic solventborne coating composition, the film-forming binder form stable solutions or dispersions. Suitable organic solvents will generally include polar functionality such as organic ester, ketone, alcohol, sulfoxide, amide or ether groups to enhance the solubility of the aminated macromonomer dispersants. The solvent may be a blend of two or more organic solvents. The coating compositions derived therefrom also contain about 10-70%, more typically 15-50% by weight of binder, and about 30-90%, more typically 50-85% by weight, of the liquid carrier which is an organic solvent or blend or organic solvents. Suitable coating compositions are prepared by blending other useful components in accordance with normal paint formulation techniques.

In addition, coating composition utilizing the dispersion of the present invention may contain a variety of other optional ingredients, including fillers, plasticizers, antioxidants, surfactants and flow control agents.

To improve weatherability of a finish produced of such coating compositions, an ultraviolet light stabilizer or a combination of ultraviolet light stabilizers can be added in the amount of about 0.1-5% by weight, based on the weight of the binder. The stabilizer may be added for example to a dispersion of this invention containing pigments or may be added directly to the coating composition. Such stabilizers include ultraviolet light absorbers, screeners, quenchers, and specific hindered amine light stabilizers. Also, an antioxidant can be added, in the about 0.1-5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica and thickeners such as the Acrylsol B copolymers from Rohm & Haas.

The coating composition of this invention can also include any of the other conventional pigments used in paints in particular paints such as metallic flakes like aluminum flake, bronze, nickel stainless steel flakes and the like, pearlescent flakes like coated mica flakes such as mica flakes coated with titanium dioxide and the like, as well as carbon black, filler pigments such as talc, china clay, barytes, carbonates, silicates, metallic oxides such as titanium dioxide, opaque iron oxides of various colors, and zinc oxide; carbon black, and a wide variety of organic pigments such as quinacridones, phthalocyanines, perylenes, azo pigments, indanthrones, carbazoles such as carbazole violet, isoindolinones, isoindolones, thioindigo reds, benzimidazolinones, and the like. Metallic flakes like aluminum flake is preferred.

Pigment dispersions of the present invention may be utilized in a pigmented color coat or base coat over which a clear coat is applied to provide a colorcoat/clearcoat finish. Also, small amounts of pigment dispersion can be added to the clear coat to provide special color or aesthetic effects such as tinting. The coating compositions of the present invention may also be utilized as a monocoat.

Coating compositions of this invention have excellent adhesion to a variety of metallic or non-metallic substrates, such as previously painted substrates, primed substrates, cold rolled steel, phosphatized steel, and steel coated with conventional electrodeposition primers. These coating compositions can be used to coat plastic substrates such as polyester reinforced fiberglass, reaction injection-molded urethanes and partially crystalline polyamides. In particular, base coat or color coat composition of this invention, provide improved transparency and reduced haze and improved paint stability, which properties are very important property for coatings used on automobiles and trucks.

Coating compositions formulated with the dispersion of this invention can be applied by conventional techniques such as spraying, electrostatic spraying, dipping, brushing, flow-coating and the like. The preferred techniques are spraying and electrostatic spraying.

In OEM applications, the composition is typically baked at 100-150° C. for about 15-30 minutes to form a coating about 0.1-3.0 mils thick. When the composition is used as a clearcoat, it is applied over the color coat which may be dried to a tack-free state and cured or preferably flash dried for a short period before the clearcoat is applied. The colorcoat/clearcoat finish is then baked as mentioned above to provide a dried and cured finish. The present invention is also applicable to non-baking refinish systems, as be in the art.

It is customary to apply a clearcoat over a basecoat by means of a "wet-on-wet" application, i.e., the clearcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated. All molecular weights disclosed herein are determined by GPC (gel permeation chromatography) using a polystyrene standard.

EXAMPLES

Example 1

Preparation of polyBMA of Mn=2600

In 1 liter flask, 400 mL of butyl methacrylate (Aldrich), 25 mg tetrakis(4-methoxyphenyl)porphyrin-Co$^{II}$ (Aldrich) and solution of 1.8 g VAZO-67® (DuPont) in 500 mL ethyl acetate were mixed until homogeneous. Nitrogen gas was passed through the solution for 30 min to remove oxygen. The temperature was raised to 80° C. After 1 h, the temperature was raised to 85 C. At 2 h, the temperature was raised to 90 C, during which time some ethyl acetate was stripped from the system. The reaction mixture was chilled to room temperature after 6 h of heating. GPC analysis showed that contained the expected macromonomer of BMA with Mn=2600 and Mw=4860. The oligomer was concentrated by evaporation under 0.1 mm Hg pressure to constant weight. The polyBMA content was found to be 61% w/v.

Example 2

Preparation of Diblock Copolymer

A sample (130 mL) of the BMA macromonomer solution from example 1 (PBMA=0.03 mol), 60 mL of dry butyl acetate and 14.2 mL of polyethyleneimine of Mn~423 (Aldrich, viscosity 200 cP; 0.036 mol) were mixed under nitrogen in a 250 mL flask. After standing for 3 weeks at room temperature, the contents were analyzed by GPC, proton NMR and MS and found to be the adduct of the polyethyleneimine to the BMA macromonomer. In particular, the proton NMR of the sample showed that signals from vinylic protons (singlets at 5.5 and 6.2 ppm) had disappeared in the addition product of polyBMA with polyethyleneimine. MS (mass-spectrometry) was conducted using standard MALDI techniques and the resulting spectra of mass-distribution showed not more than 10% of unreacted polyBMA in the samples.

Example 3

Preparation of polyBMA of Mn=3260

The macromonomer was obtained in a manner analogous to example 1 except 360 mL BMA and 15 mg tetrakis(4-methoxyphenyl)porphyrin-Co(II) were utilized. GPC analysis showed that obtained product contained BMA macromonomers with Mn=3260 and Mw=4860. Concentration of the macromonomers in the solution was accomplished by evaporation under 0.1 mm Hg pressure to constant weight. The polyBMA content was found to be 42% w/v.

Example 4

Preparation of Diblock Copolymer

A sample (236 mL) of the macromonomer from example 3 (Mn=3260, 0.03 mol) was reacted with 11.9 ml of polyethyleneimine of Mn~423 (Aldrich, viscosity 200 cP; 0.03 mol) under nitrogen in 250 ml flask. After 3 weeks at room temperature the content was analyzed by GPC, proton NMR and MS and found to be the adduct of the macromonomer with polyethyleneimine. In particular, the proton NMR of the sample showed that signals from vinylic protons (singlets at 5.5 and 6.2 ppm) had disappeared in the addition product of polyBMA with polyethyleneimine. MS (mass-spectrometry) was conducted using standard MALDI techniques and the resulting spectra of mass-distribution showed not more than 10% of unreacted polyBMA in the samples.

Example 5

Pigment Dispersions

Dispersion of Magenta Pigment was carried out employing the product of Example 2 with 12 hr grind using 10% solids and a pigment to dispersant ratio of P/D=1.5. The general procedure for dispersion preparation was to mix the macromonomer and butyl acetate together until well mixed and then to mix the polymer/solvent solution with the pigment in the 01-attritor using the following conditions:

Media=Steel Shot

Media Size=⅛ inch

Speed=350 RPM

Media Load=1816 g (full load)

Grind Time=12 h

Batch Size=350 g

Samples were drawn down onto Mylar film at 8, 10 and 12 hrs. The haze and transmittance were monitored starting at 8 hours and going until 12 h.

| Time  | Transmittance | Haze  |
|-------|---------------|-------|
| 8 hrs | 17.20         | 10.95 |
| 10 hr | 17.78         | 8.14  |
| 12 hr | 17.09         | 6.89  |

Example 6

Pigment Dispersions

Dispersion of Magenta Pigment was carried out employing the product of Example 4 with 12 hr grind using 10% solids and a pigment to dispersant ratio of P/D=1.5.

| Time  | Transmittance | Haze  |
|-------|---------------|-------|
| 8 hrs | 17.02         | 10.48 |
| 10 hr | 17.24         | 8.57  |
| 12 hr | 17.57         | 7.03  |

Example 7

Pigment Dispersions

Dispersion of Magenta Pigment was carried out employing the product of Example 2 with 12 hr grind using 25% solids and a pigment to dispersant ratio of P/D=1.5.

| Time  | Transmittance | Haze  |
|-------|---------------|-------|
| 8 hrs | 10.69         | 23.71 |
| 10 hr | 11.14         | 19.32 |
| 12 hr | 10.93         | 17.16 |

Example 8

Preparation of Diblock Copolymer

A sample of the BMA macromonomer solution from example 1 and N-(aminoethyl) phthalimide is mixed under nitrogen in a 250 mL flask and the mixture is heated to 80° C. for 8 hours under a nitrogen atmosphere. The resulting product is

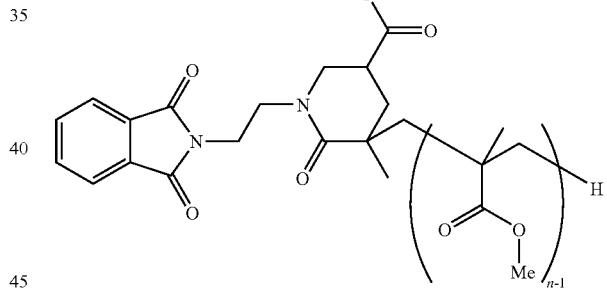

Example 9

Pigment Dispersions

Dispersion of a phthalocyanine pigment is carried out employing the product of Example 8 with 12 hr grind using 10% solids and a pigment to dispersant ratio of P/D=1.5. An effective dispersion is obtained.

What is claimed is:

1. A pigment dispersion composition useful for forming coating compositions comprising a dispersed pigment, a liquid carrier and an aminated macromonomer dispersant; wherein:

the aminated macromonomer dispersant comprises the structure

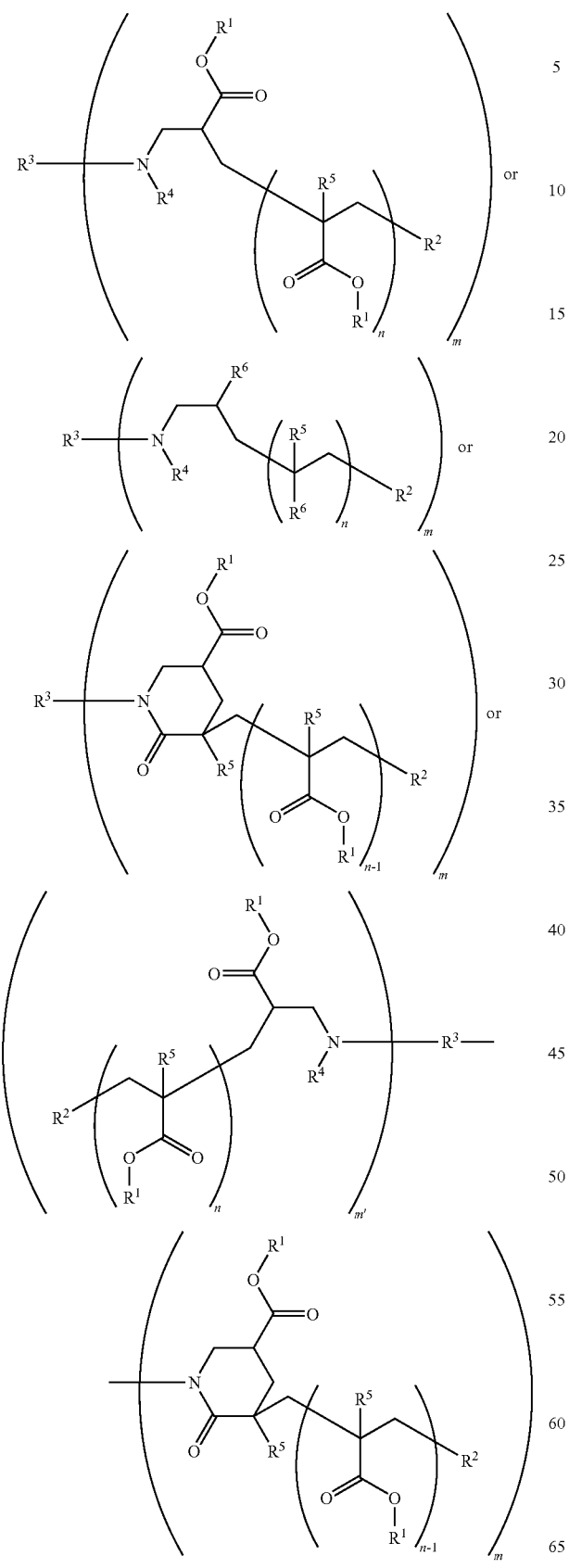

wherein each $R^1$ and $R^2$ are independently H, alkyl of 1-20 carbon atoms, aryl, substituted alkyl of 1-20 carbon atoms, or substituted aryl; $R^3$ and $R^4$ are independently H, alkyl of 1-100 carbon atoms, or substituted alkyl of 1-100 non-hydrogen atoms or $R^3$ is a polymer; $R^5$ is methyl, hydrogen or hydroxymethyl; n=1-100; m=1-100 or m+m'=2-100 and is equal to or less than the number of reactive amino groups on $R^3$, and; $R^6$ are independently —CN, —$CO_2R^1$, —$COR^1$, or —$CON^1R^1R^1$; wherein said substituted alkyl of 1-20 carbon atoms and said substituted alkyl of 1-100 non-hydrogen atoms are substituted alkyls having the same or different substituents selected from the group consisting of carboxylic ester, hydroxyl, alkoxy, amino, trifluoromethyl, perfluoroalkyl, alkyl, aryl, and halogen, or substituted alkyls having one or more carbon atoms other than the first carbon atom substituted with heteroatoms selected from the group consisting of oxygen, sulfur, silicon, and tin, wherein substituents in said substituted aryl are the same or different and are selected from the group consisting of carboxylic ester, hydroxyl, alkoxy, amino, secondary amino, tertiary amino, trifluoromethyl, perfluoroalkyl, alkyl, aryl, and halogen.

2. The dispersion of claim 1 wherein $R^3$ is derived from a polymeric amine.

3. The dispersion of claim 1 wherein $R^3$ is derived from polyethyleneimine.

4. The dispersion of claim 1 wherein $R^3$ is derived from a polymeric and polyfunctional amine.

5. The dispersion of claim 1 wherein $R^2$ is derived from a macromonomer of an alkyl methacrylate.

6. The dispersion of claim 1 wherein the weight ratio of pigment to said aminated macromonomer dispersant is about 1/100-200/100.

7. The dispersion of claim 1 wherein $R^3$ is derived from polyethyleneimine and $R^2$ is derived from a macromonomer of an alkyl methacrylate.

8. The dispersion of claim 1 wherein $R^3$ is derived from an N-aminoalkylphthalimide, an N-aminoalkylsaccharin, an aminoalkyl ester of nitrobenzoic acid or an aminoalkyl ester of benzoic acid and $R^2$ is derived from a macromonomer of an alkyl methacrylate.

9. A coating composition comprising the pigment dispersion composition of claim 1.

10. A substrate coated with a dried and cured layer of the coating composition of claim 9.

11. A process for preparing the pigment dispersion of claim 1, wherein said process comprises:

a) reacting a macromonomer having one terminal ethylenically unsaturated bond with an amine compound to form an aminated macromonomer dispersant wherein:

the resulting aminated macromonomer dispersant comprises the structure

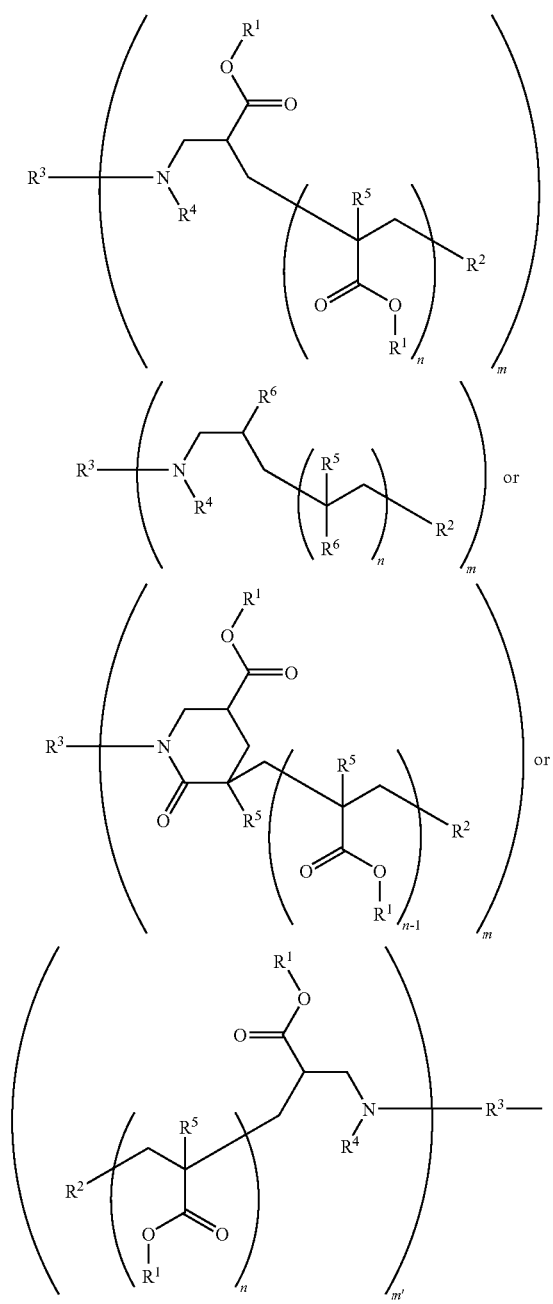

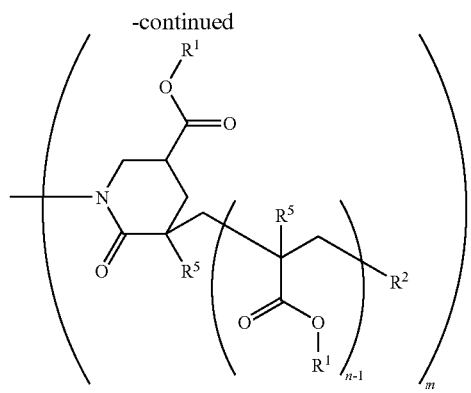
-continued wherein each $R^1$ and $R^2$ are independently H, alkyl of 1-20 carbon atoms, aryl, substituted alkyl of 1-20 carbon atoms, or substituted aryl; $R^3$ and $R^4$ are independently H, alkyl of 1-100 carbon atoms, or substituted alkyl of 1-100 non-hydrogen atoms or $R^3$ is a polymer; $R^5$ is methyl, hydrogen or hydroxymethyl; n=1-100; m=1-100 or m+m'=2-100 and is equal to or less than the number of reactive amino groups on $R^3$, and; $R^6$ are independently —CN, —$CO_2R^1$, —$COR^1$, or —$CON^1R^1R^1$; wherein said substituted alkyl of 1-20 carbon atoms and said substituted alkyl of 1-100 non-hydrogen atoms are substituted alkyls having the same or different substituents selected from the group consisting of carboxylic ester, hydroxyl, alkoxy, amino, trifluoromethyl, perfluoroalkyl, alkyl, aryl, and halogen, or substituted alkyls having one or more of carbon atoms other than the first carbon atom substituted with heteroatoms selected from the group consisting of oxygen, sulfur, silicon, and tin, wherein substituents in said substituted aryl are the same or different and are selected from the group consisting of carboxylic ester, hydroxyl, alkoxy, amino, secondary amino, tertiary amino, trifluoromethyl, perfluoroalkyl, alkyl, aryl, and halogen;

b) forming, in an organic solvent, a dispersion of said aminated macromonomers of step (a); and
  c) dispersing pigment in the aminated macromonomer dispersion to form said pigment dispersion.

12. The pigment dispersion of claim 1 wherein said liquid carrier is an aqueous medium or organic solvent.

* * * * *